United States Patent [19]

Bauman

[11] Patent Number: 4,880,879
[45] Date of Patent: Nov. 14, 1989

[54] ABRASION RESISTANT COMPOSITE MATERIAL AND PROCESS FOR MAKING THE SAME

[75] Inventor: Bernard D. Bauman, Coopersburg, Pa.

[73] Assignee: Air Products and Chemicals, Inc., Allentown, Pa.

[21] Appl. No.: 157,679

[22] Filed: Feb. 18, 1988

[51] Int. Cl.$^4$ .............................. C08F 8/00
[52] U.S. Cl. ............................. 525/130; 525/334.1
[58] Field of Search ..................... 525/130, 334.1

[56] References Cited

U.S. PATENT DOCUMENTS

| | | | |
|---|---|---|---|
| 3,272,890 | 9/1966 | O'Leary | 525/130 |
| 3,310,604 | 3/1967 | Steingiser et al. | 525/130 |
| 3,351,676 | 11/1967 | Saunders et al. | 525/130 |
| 3,600,289 | 8/1971 | Bragole | 525/130 |
| 3,670,049 | 6/1972 | Stein et al. | 525/130 |
| 3,929,928 | 12/1975 | Wolf, Jr. et al. | 525/130 |
| 3,940,520 | 2/1976 | Dixon et al. | 427/444 |
| 3,970,715 | 7/1976 | Jarrett | 525/130 |
| 4,009,304 | 2/1977 | Dixon et al. | 427/322 |
| 4,029,862 | 6/1977 | Liu et al. | 525/334.1 |
| 4,206,102 | 6/1980 | Britain et al. | 525/130 |
| 4,536,266 | 8/1985 | Bliefert et al. | 525/334.1 |
| 4,692,470 | 9/1987 | Bauman et al. | 521/55 |
| 4,771,110 | 9/1988 | Bauman et al. | 525/130 |

OTHER PUBLICATIONS

H. Schonhorn et al., "Surface Treatment of Polymers II, Effectiveness of Fluorination as a Surface Treatment for Polyethylene,"J. App. P. Sci., vol. 12, pp. 1231-1237 (1968).

Primary Examiner—Marion C. McCamish
Assistant Examiner—Nizar M. Ibrahim
Attorney, Agent, or Firm—Mark L. Rodgers; William F. Marsh; James C. Simmons

[57] ABSTRACT

The present invention is a composite material and a process for making the same. The composite material comprises a thermoset or condensation polymeric material into which has been dispersed high molecular weight polyethylene particles which have been surface treated to have a surface tension of at least 40 dyne/cm at 20° C. The polyethylene particles are dispersed into the thermoset or condensation polymeric material in a concentration range of 2-80 wt % and preferably from 4-66 wt % of the total composite. The resultant composite material exhibits high abrasion resistance and can easily be molded into end products.

7 Claims, 1 Drawing Sheet

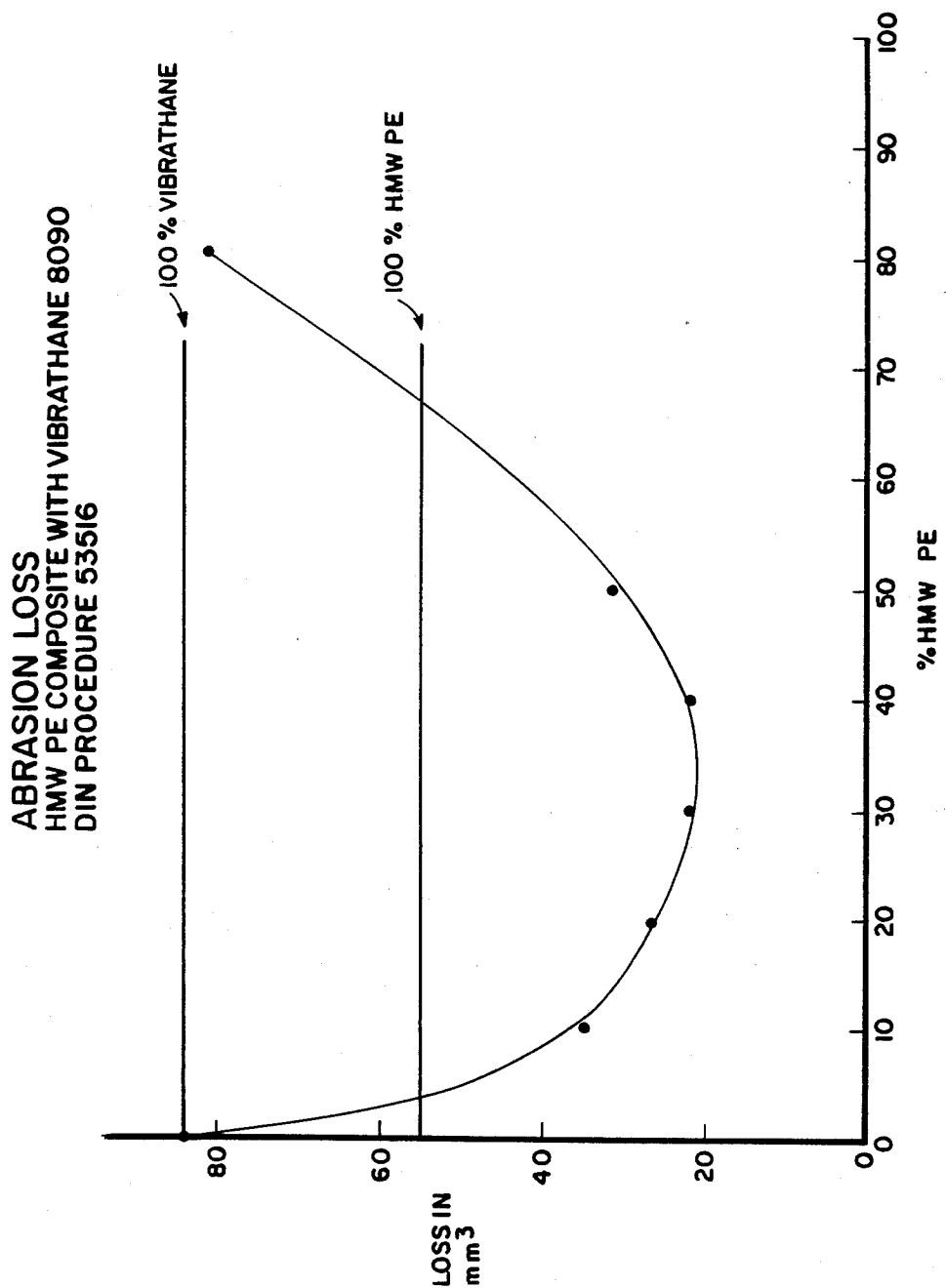

ABRASION RESISTANT COMPOSITE MATERIAL AND PROCESS FOR MAKING THE SAME

TECHNICAL FIELD OF THE INVENTION

The present invention relates to a process for making composite polymeric materials, and also to the composite materials themselves.

BACKGROUND OF THE INVENTION

High molecular weight polyethylene (HMW PE) has outstanding abrasion resistance properties, thereby making it the material of choice for high abrasion applications, such as mining equipment, pillow blocks, wear strips, and gears. One problem associated with HMW PE is that it is difficult to fabricate into end products partially because it is not a typical thermoplastic material due to its high molecular weight. One method for making products consists of sintering HMW PE resin into solid blocks using heat and pressure which are then machined to form end products. This process is very time consuming, requires significant labor, and generates much scrap. Another method for forming HMW PE end products is by ram extrusion which is used primarily for making profiles and in which the productivity is measured in inches per hour.

A second problem associated with HMW PE is its high coefficient of thermal expansion, relative to metal. Hence, when sheets of HMW PE are clad to steel surfaces, as in protective liners for ore ships, hopper cars, and truck beds, provisions must be made to accommodate relative growth and shrinkage. Attempts to solve problems associated with attaching HMW PE to metal surfaces generally involve using many fasteners in small sheets. Recently, a mounting system was developed which consists of bolts through slotted grooves in the HMW PE sheets. These areas, in turn, have to be protected with HMW PE cover strips. In any case, installation is a time consuming and expensive process.

Attempts to solve problems associated with fabricating HMW PE end products have primarily involved blending-in lower molecular weight PE or adding softening agents in order to enable thermoplastic processing techniques to be used. These approaches have had only limited success, and they result in compromising physical performance properties. Adding other plastics with HMW PE to form a composite having a unique combination of physical properties is one potential solution to the above problems. In the past such composites have been produced by mechanically combining or chemically bonding two or more polymers. For example, acrylonitrile-butadiene-styrene terpolymer is produced by grafting polyacrylonitrile (a rigid polymer) onto polystyrene-butadiene (an elastic polymer). A common method for physically combining two materials into a composite is by blending. In this manner, for example, there is produced a blended composite of polybutylene terephthalate with polycarbonate (a very rigid material). The known chemical methods of making composite polymers require very precise control of processing conditions in order to produce products of desired uniform characteristics. The available physical alternatives, on the other hand, require good compatibility among the constituent materials to avoid phase separation, which limits the choice of polymers which can be thus combined with one another. The virtually rules out blends of highly elastomeric materials with rigid plastics because, most often, these are incompatible.

U.S. Pat. No. 4,692,470 discloses a method of incorporating finely divided polymeric solid particles into viscus liquids by incorporating a wetting agent which is effective for displacing absorbed air from the surface, crevices and pores of the particles thereby allowing better wetting and incorporation of the particles into the viscus liquids.

An article by H. Schonhorn, et al. entitled "Surface Treatment of Polymers. II Effectiveness of Fluorination as a Surface Treatment for Polyethylene" *J. App. P. Sci.*, Vol. 12 pp 1231–1237 (1968), discloses an effective surface treatment for adhesive bonding of polyethylene. The surface treatment disclosed involves exposing the polymer to an environment of chemical fluorine or fluorine diluted in argon. It is disclosed that treatment of the polymer with elemental fluorine most likely effectively eliminates the weak boundary layer associated with polyethylene by either cross-linking or by increasing the molecular weight in the surface region.

U.S. Pat. No. 4,009,304 discloses a process for improving the adhesion of polyester yarn, tire cord or fabric in polyester reinforced rubber goods, such as tires, by fluorinating the polyester yarn, tire cord or fabric prior to incorporating such into the tire or rubber goods. Additionally, U.S. Pat. No. 3,940,520 teaches a process for improving the water wicking and moisture transport properties of synthetic resins, such as polyolefins, by contacting said resins to a gaseous reaction medium containing elemental fluorine and sulfur dioxide.

BRIEF SUMMARY OF THE INVENTION

The present invention is a composite material and a process for making the same. The composite material comprises a thermoset or condensation polymeric material which has a surface tension of at least 40 dyne/cm at 20° C. Dispensed within this thermoset or condensation polymeric material are high molecular weight polyethylene particles which have been surface treated to have a surface tension of at least 40 dyne/cm at 20° C. The polyethylene particles are dispersed into the thermoset or condensation polymeric material in a concentration range of 2-80 wt% and preferably from 4-66 wt% of the total composite material.

The surface treatment of the high molecular weight polyethylene particles can be any type of treatment which is capable of producing a particle surface having the required surface tension. This treatment allows the polyethylene particles to be incorporated into a wide variety of polymeric materials, with the only strict requirement being that the polymeric material have a surface tension of at least 40 dyne/cm at 20° C.

The present invention thereby allows a wide variety of composite materials to be produced which were not possible using prior art methods. Additionally, high molecular weight polyethylene-containing composite materials can be formed which have desirable properties, such as high abrasion resistance and the ability to be easily molded into end products.

BRIEF DESCRIPTION OF THE DRAWING

The drawing of FIG. 1 is a graph of abrasion loss of the composite material in mm$^3$ vs. wt% of HMW PE present in the composite.

DETAILED DESCRIPTION OF THE INVENTION

The present invention is a composite material and a process for making the material. The composite material comprises a thermoset or condensation polymeric material into which has been dispensed high molecular weight polyethylene (HMW PE) particles which have been surface treated to have a surface tension of at least 40 dyne/cm at 20° C. The HMW PE particles are dispensed into the thermoset or condensation polymeric material in a concentration range of 2-80 wt% and preferably between of 4-66 wt% of the total composite.

The composite material is formed by initially treating HMW PE particles in a suitable manner to increase the surface tension of the particles to at least 40 dyne/cm at 20° C. In addition to increasing the surface energy, such treatments also impart reactive functionalities on the surface of the particles which renders them compatible with polar systems, thereby facilitating tenacious bonding between such systems and the particles. The HMW PE particles are typically in the form of virgin resin or ground scrap, and have a molecular weight of at least 1 million, and preferably in a range of 1 to 9 million. The HMW PE particles can be treated by a wide variety of methods which are capable of increasing the surface tension to the required level since only the resultant surface tension and not the method of treatment is critical. Such treatments include exposure to a fluorine-containing gas, a plasma of an inorganic gas, sulfur trioxide, halogens, oxidative acids, ionizing radiation, ultraviolet light, peroxides, ozone, surfactants and corona treatment. Surface treatment of the HMW PE particles can be carried out batch-wise or in a continuous process at conditions of time, temperature and pressure which are best suited for the particular type of treatment used.

The surface treatment must increase the surface tension of the HMW PE particles to a value of at least 40 dyne/cm at 20° C. to insure sufficient bonding of the particles to the polymeric material to prevent the particles from "popping out" of the composite during use. Since the surface tension of fine particles cannot be measured directly, measurements for the present invention were made by molding small test plaques; e.g. about 4 cm², from the same HMW PE resin and included with the particles during treatment. Surface tension of the particles was assumed to be the same as that of the test plaques quantified via the geometric-mean method, which is based on the contact angles of two testing liquids, as described by Souheng Wu, "Surface Tension and Polarity of Solid Polymers", *Polymer Interface and Adhesion. Dekker Pub.* (1982).

After the HMW PE particles are treated, they are added to a polymeric material which forms the continuous phase of the composite material. The polymeric material is typically a thermoset or condensation polymer such as epoxy, polyurethane, polysulfide, urea formaldehyde, phenol formaldehyde, silicone, nylon, polyester, polycarbonate, acrylics, styrenes and mixtures thereof. The surface tension of the polymeric material should also be at least 40 dyne/cm at 20° C. so as to insure tenacious bonding with the added particles. For polymeric materials which are thermoset prepolymers, water-based systems or polymers dissolved in organic solvents, the surface tension can be measured directly. However, for polymers into which the surface-modified particles are to be blended at high temperatures, such as by milling, blending, and the like, an indirect method must be used. The treated HMW PE particles can be simply added to the polymeric material in a solvent system, may be blended at high temperatures or added in any other suitable manner. Whatever method is used, the particles should be mixed to close to homogeneity. The particles should be added in a concentration of about 2-80 wt% and exhibit best results when present in a concentration from 4-66 wt% based upon the composite material.

The composite materials of the present invention exhibit a wide variety of desirable properties, such as high abrasion resistance, increased tear resistance, weight reduction compared to a single component structure, increased hardness, reduced moisture absorption and ease of casting or molding into end products. Additionally, when elastomeric continuous phase matrix materials are used, such as polyurethane, these composites can be clad directly to metal surfaces because the system can stretch or compress in response to temperature-induced dimensional changes. One especially surprising characteristic of the composite materials is that they exhibit abrasion resistances which are significantly greater than for either starting material alone.

The following examples are provided to illustrate the invention and are not meant to be limiting.

EXAMPLE 1

The effect of filling two different polyurethane formulations with surface-modified HMW PE, was studied by measuring the volume loss of cured buttons when abraded with an emery paper in accordance with standard abrasion test DIN 53516. Initially, buttons of diameter 16mm and depth 15mm were press cured at 100° C. for 30 mins and then post cured at 60° C. for 16 hours. The buttons were formulated to contain various amounts of either HMW PE scrap or HMW PE resin. The polyurethane formulations consisted of either Vibrathane 8090 (a polyester-based TDI prepolymer), or Adiprene L100 (a polyether-based TDI prepolymer), both available commercially from UniRoyal Chemical, Co., cured with 1,4-butanediol and trimethylolpropane (TMP) in the presence of triethylenediamine sold under the trademark DABCO ® by Air Products and Chemicals, Inc. The HMW PE scrap or resin was surface treated with a gas stream comprising 2.5 volume % $F_2$: 81.5 volume % $N_2$: and 16 volume % $O_2$ at a temperature of 20° C. for ten min., prior to being added to the polyurethane formulations.

Table 1 below shows the density, hardness (Shore A) and volume loss during abrasion for the Vibrathane-HMW PE composites, as well as for vibrathane alone (control).

TABLE 1

| | Abrasion Resistance, Density and Hardness of Cured Vibrathane Buttons | | | | |
|---|---|---|---|---|---|
| | % HMW PE Content | | Hardness | Density | Volume loss during abrasion |
| Sample | Scrap | Resin | Shore A | (g/m³) | in mm³ |
| Control | — | — | 58 (0.5) | 1.248 | 83.5 (4.2)* |
| 1 | — | 10 | 68 (0.5) | 1.209 | 35.0 (1.00) |
| 2 | 10 | — | 69 (1.0) | 1.203 | 54.5 (0.4) |
| 3 | — | 20 | 78 (0.5) | 1.174 | 27.1 (1.7) |
| 4 | 20 | — | 79 (0.4) | 1.159 | 37.9 (1.4) |
| 5 | — | 30 | 87 (1.2) | 1.143 | 20.9 (2.3) |
| 6 | 30 | — | 85 (1.0) | 1.082 | 31.4 (2.7) |
| 7 | — | 40 | 94 (1.2) | 1.063 | 20.9 (4.0) |
| 8 | 40 | — | 91 (0.6) | 1.050 | 25.6 (1.5) |
| 9 | — | 50 | 95 (0.5) | 1.121 | 30.9 (2.2) |
| 10 | 50 | — | 95 (0.8) | 1.103 | 27.2 (1.1) |

TABLE 1-continued
Abrasion Resistance, Density and Hardness of Cured Vibrathane Buttons

| Sample | % HMW PE Content Scrap | % HMW PE Content Resin | Hardness Shore A | Density (g/m³) | Volume loss during abrasion in mm³ |
|---|---|---|---|---|---|
| 11 | — | 70 | 98 (1.5) | 0.895 | High** |
| 12 | 70 | — | — | 0.995 | 26.6 (1.4) |
| 13 | — | 80 | 98 (0.8) | 0.876 | 81.4 (15.4) |
| 14 | 80 | — | 97 (0.4) | 0.940 | 41.3 (6.1) |
| 15 | — | 90 | 97 (0.7) | 0.839 | High |
| 16 | 90 | — | 96 (0.6) | | High |

*First numbers are mm³ material lost, and numbers in parenthesis are standard deviation of results performed in triplicate.
**Samples had very poor physical integrity and fell apart upon testing.

Table 2 below shows the density, hardness (Shore A) and volume lost during abrasion for the Adiprene-HMW PE composite materials as well as for Adiprene alone (control). Sample 11, having a HMW PE scrap content of 70%, for some unknown reason had poor physical integrity, and this result is inconsistent with the rest of the data and hence, was considered unrepresentative.

TABLE 2
Abrasion Resistance, Density and Hardness (Shore A) of Cured Adiprene Buttons

| Sample | % HMW PE Content Scrap | % HMW PE Content Resin | Hardness Shore A | Density (g/m³) | Volume loss during abrasion in mm³ |
|---|---|---|---|---|---|
| Control | — | — | 64 (0.5) | 1.078 | 103.6 (1.8) |
| 17 | 10 | — | 72 (1.3) | 1.058 | 56.8 (3.8) |
| 18 | — | 10 | 70 (0.7) | 1.066 | 24.8 (2.5) |
| 19 | 50 | — | 95 (0.5) | 0.991 | 32.0 (1.0) |
| 20 | — | 50 | 99 (0.8) | 1.012 | 37.4 (2.1) |
| 21 | 90 | — | 98 (0.4) | 0.918 | 64.0 (9.5) |
| 22 | — | 90 | 99 (0) | — | High** |

*First numbers are mm³ material lost, and numbers in parenthesis are standard deviation of results performed in triplicate.
**Samples had very poor physical integrity and fell apart upon testing.

Both Tables 1 and 2 above clearly show that the presence of either grade of surface-modified HMW PE causes an increase in the hardness of both the Vibrathane and Adiprene formulations. They also effect a dramatic increase in the abrasion resistance of the formulation, for example the volume loss during abrasion is reduced from 83.5 mm³ for Vibrathane alone to 35.0 mm³ (Sample 1) on the addition of only 10 parts of the surface-modified HMW PE Resin to the Vibrathane formulation. Addition of the same amount of Resin to the Adiprene formulation reduced the volume loss during abrasion from 103.6 mm³ for Adiprene alone to 24.8 mm³. In the Vibrathane formulation the greatest abrasion resistance was achieved by the addition of 30 parts of resin, such a formulation (Sample 5) showing a volume loss of only 20.9 mm³. In the Adiprene formulation the lowest volume loss during abrasion achieved was by the addition of 10 parts of resin to give a volume loss of 24.8 mm³ this may not be the optimum formulation, however, since only a small number of Adiprene samples were formulated.

EXAMPLE 2

A high wear resistant grade of HMW PE, Hostalen GUR 415, was obtained from Hoechst Plastics as a free-flowing powder and was molded into buttons of diameter 16 mm and 15 mm, by compression molding at 220° C. The material was held in the press at 220° C. for 30 minutes to ensure that all the material had become plasticated. The press was then allowed to cool and the mold was subsequently removed. HMW PE buttons which were homogeneous in appearance were recovered for testing.

Additionally, both Adiprene L100 and Vibrathane 8090 polyurethane formulations were filled to varying degrees with fluorine treated virgin resin or ground scrap Hostalen GUR 415 and cured using a low molecular weight diol to form composite materials.

The abrasion resistance of the molded buttons of Hostalen GUR 415 as well as of several of the composite materials was assessed by measuring their volume loss when abraded with an emery paper in accordance with standard abrasion test DIN 53516. The results of the abrasion tests are reported in Table 3 below.

TABLE 3
Comparison of the Abrasion Resistance of HMW PE with that of Polyurethane Composites Containing Surface-modified HMW PE

| Sample | Volume loss during Abrasion in mm³ |
|---|---|
| HMW PE, approx. MW = 6 × 10⁶ (Hostalen) | 51.7 (11.1)* |
| Vibrathane filled with 10 parts Resin | 35.0 (1.0) |
| Vibrathane filled with 30 parts Resin | 20.9 (2.3) |
| Vibrathane filled with 70 parts Scrap | 26.6 (1.4) |
| Adiprene filled with 10 parts Resin | 24.8 (2.5) |
| Adiprene filled with 50 parts Scrap | 32.0 (1.0) |

*First numbers are mm³ material lost, and numbers in parenthesis are standard deviation of results performed in triplicate.

The data reported in Table 3 above clearly shows that polyurethane composites with superior abrasion resistance to that of Hostalen GUR 415, a high abrasion resistant grade of HMW PE, are obtained by filling polyurethane formulations with the surface-modified HMW PE. The easier processing of the polyurethane composites, requiring lower temperatures, makes them an attractive alternative to HMW PE, especially in view of their high abrasion resistance. This further points out the synergystic effect of the composite material, since unexpectedly, the composite exhibited a significantly higher abrasion resistance than the more abrasion resistant component (HMW PE) alone.

To further illustrate the synergystic effect of the composite materials on abrasion resistance, the results reported in Table 1 for abrasion resistance of Vibrathane-HMW PE composite structures are presented in the graph of FIG. 1 as a function of % HMW PE resin incorporated into the composite. For a comparison, the abrasion resistance of 100% HMW PE and 100% Vibrathene are also shown. Typically, it would be expected for the abrasion resistance of a composite material to be between the abrasion resistance of the two components alone. As can be seen from the graph, however, this is not the case, as the composite material, when containing between about 4-66 wt. % HMW PE, actually exhibits a greater abrasion resistance than either single component.

EXAMPLE 3

Two Vibrathane 8090/HMW PE samples were prepared in accordance with the procedures set out in Example 1 above. One sample was prepared using untreated HMW PE resin, while the second sample was prepared using HMW PE resin treated (surface modified) with a fluorine-containing gas stream described in Example 1. A color change occurred in the formulation containing the treated resin, indicating some type of chemical interaction may have occurred. No such color change was observed in the formulation containing the untreated resin. Abrasion resistance of both samples was measured using DIN 53516 standard test, and the results are reported in Table 4 below.

TABLE 4

| Sample | Volume loss during Abrasion in mm³ |
|---|---|
| Vibrathane 8090/untreated HMW PE (70/30) | 73.7 |
| Vibrathane 8090/treated HMW PE (70/30) | 20.8 |
| Vibrathane 8090/treated HMW PE (70/30) | 20.9 |

The results reported in Table 4 above show that the sample with the surface treated HMW PE gave 350% better abrasion resistance results than the sample with the untreated HMW PE resin, thereby clearly demonstrating the criticality of the surface treatment. Additionally, a comparison of the composite using treated resin in this example, with a sample from Example 1, indicates that the present process produces composite materials which exhibit properties which are readily reproducable.

Having thus described the present invention what is now deemed appropriate for Letters Patent is set out in the following appended claims.

What is claimed is:

1. A composite material which can be easily molded into end products and which exhibits high abrasion resistance, comprising: a polyurethane material which has a surface tension of at least 40 dyne/cm at 20° C., into which has been dispersed high molecular weight polyethylene particles which have been surface treated to have a surface tension of at least 40 dyne/cm at 20° C., said particles comprising from 4 to 66 wt% of the composite material.

2. A composite material in accordance with claim 1 wherein said polyethylene particles have a molecular weight in a range from 1 to 9 million.

3. A composite material in accordance with claim 1 wherein said high molecular weight polyethylene particles have been surface treated with a reactive gas stream comprising fluorine.

4. A composite material in accordance with claim 1 wherein said high molecular weight polyethylene particles are in the form of virgin resin or ground scrap.

5. A composite material in accordance with claim 3 wherein the surface composition of the high molecular weight polyethylene particles after treatment is 7-15% 0, 7-15% F, with the balance carbon.

6. A composite material in accordance with claim 1 wherein said high molecular weight polyethylene particles have been surface treated by exposure to a plasma field of an inorganic gas.

7. A composite material in accordance with claim 1 wherein said high molecular weight polyethylene particles have been surface treated with a material selected from the group consisting of: $Cl_2$, ozone, $SO_3$, surfactants, oxidative acids or mixtures thereof.

* * * * *